United States Patent [19]
Rasmussen et al.

[11] 3,788,662
[45] Jan. 29, 1974

[54] UTILITY CART
[75] Inventors: Richard A. Rasmussen, Long Beach; Mariano Jimenez, Jr., Huntington Park, both of Calif.
[73] Assignee: James M. Rasmussen, Inglewood, Calif.; Part interest
[22] Filed: Mar. 17, 1972
[21] Appl. No.: 235,479

[52] U.S. Cl............................ 280/47.11, 280/79.2
[51] Int. Cl.............................................. B62b 3/00
[58] Field of Search...... 280/47.11, 47.35, 47.34, 280/79.1, 79.2, 79.3; 248/129

[56] References Cited
UNITED STATES PATENTS

| | | | |
|---|---|---|---|
| 3,210,091 | 10/1965 | Ng | 280/47.35 |
| 2,481,837 | 9/1949 | Giese | 280/47.34 X |
| 2,904,345 | 9/1959 | Bradley | 248/129 X |
| D185,203 | 5/1959 | Hollinger | 280/47.35 X |

FOREIGN PATENTS OR APPLICATIONS
568,086   9/1943   Great Britain................. 280/47.34

*Primary Examiner*—Kenneth H. Betts
*Assistant Examiner*—John A. Pekar
*Attorney, Agent, or Firm*—Francis X. Lo Jacono, Sr.

[57] ABSTRACT

There is disclosed a utility cart having a uni-construction comprising a shell-like body with a leading low-bed portion followed by first and second integrally formed, box-shaped carriage housings, the housings being separated by an intermediate bed portion which is integrally attached to the opposing lower sides of each housing. The top walls of each housing are provided with a plurality of vertical receptacles for receiving various tools or articles which are adapted to be removably interconnected to a handle, the handle being removably secured to a steering means movably supported in the leading low-bed portion. A pair of wheels are operably supported in the rear area of the body whereby, together with the steering means, the cart can be transported.

2 Claims, 6 Drawing Figures

PATENTED JAN 29 1974 3,788,662

UTILITY CART

BACKGROUND OF THE INVENTION

1. Field of the Invention

This invention relates to utility carts or wagons and more particularly to pull carts which are designed for use in gardening and the like.

2. Description of the Prior Art

As is well known in the art, various problems and difficulties have been encountered in providing an apparatus having suitable means whereby the average individual can take proper care of his garden with a minimum amount of work and a minimum number of gardening tools. Heretofore, various types of wheelbarrels, wagons, and poorly designed carts have been employed by gardening enthusiasts. These above items lack the necessary cooperating means for carrying such items as trash cans, rakes, hoes, brooms, shovels and various other objects. It can be understood, therefore, that time and energy are wasted in taking these items out of storage and, after working with them, returning them to the proper storage area. It is felt by the applicants that a cart providing carriage means for various interrelated tools would be a welcome improvement over the art and, to their knowledge, there is no apparatus having features to provide the solutions to the above problems.

SUMMARY OF THE INVENTION

The present invention herein discloses an apparatus for use as a utility cart whereby various gardening tools and devices can be carried with the cart, and, in addition, can be used to haul various trash containers supported thereon for disposing of grass cuttings, leaves, etc. The cart comprises a monolithic, shell-like body having a leading low-bed frame portion followed by an integrally formed, box-shaped carriage housing. This carriage housing is interconnected to a second rearwardly disposed carriage housing by an intermediate low-bed frame which is integrally formed to the opposing vertical walls of each carriage housing. Each housing includes a top wall having a plurality of openings forming vertical receptacles adapted to receive various head portions of gardening tools and like instruments. That is, a shovel head, broom head, etc., are capable of being supported in the above-mentioned receptacles, and each is provided with securing means whereby the cart handle is removed from the forward steering means and is attached to any one specific tool.

There is a rear wheel assembly operably supported within the body shell along with the steering means which is rotatably mounted in the forward low-bed frame for ease of transporting the cart and its accompanying articles.

Included as an integral part of the shell-like body is a rear compartment wherein a variety of miscellaneous items such as chemicals, gloves, shears, etc., are stored.

OBJECTS AND ADVANTAGES OF THE INVENTION

The present invention has for an important object a provision whereby a compact utility cart is capable of a multiplicity of uses and incorporates means for carrying, simultaneously, a trash container along with a variety of garden tools.

It is another object of the present invention to provide a utility cart for use in gardening which has a uniconstructed, shell-like body.

It is still another object of the invention to provide a utility cart wherein the steering handle is also used as a handle for each tool head that is adapted to be carried by said body.

It is a further object of the invention to provide an apparatus of this character that is easy to service and maintain.

It is still a further object of the invention to provide an apparatus of this character that is relatively inexpensive to manufacture.

Still another object of the invention is to provide an apparatus of this character that is simple and rugged in construction.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only.

DESCRIPTION OF THE PREFERRED EMBODIMENT

Figure 1:
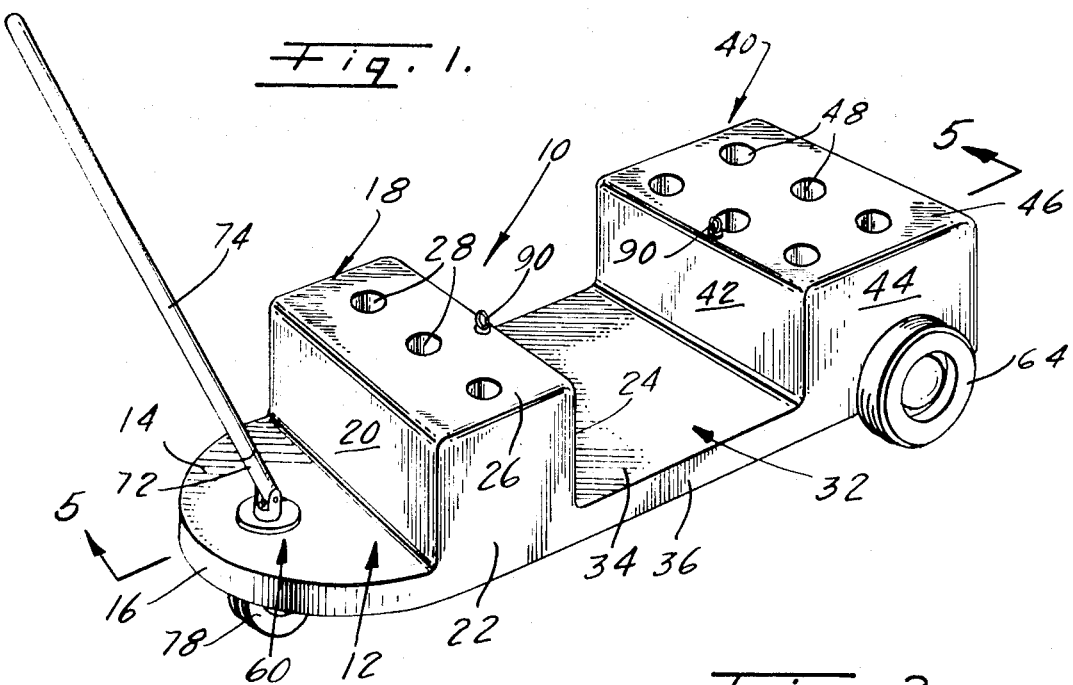
FIG. 1 is a perspective view of the present invention.

Referring more particularly to the drawing, there is shown a utility cart having a uniconstructed, monolithic, shell-like body particularly designed for use in garden areas where there is a need for hauling plant cuttings and/or soil, and related bulk items, as well as a variety of tools. However, it is to be understood that the present invention is not restricted thereto and will accommodate other utilities.

Figure 2:
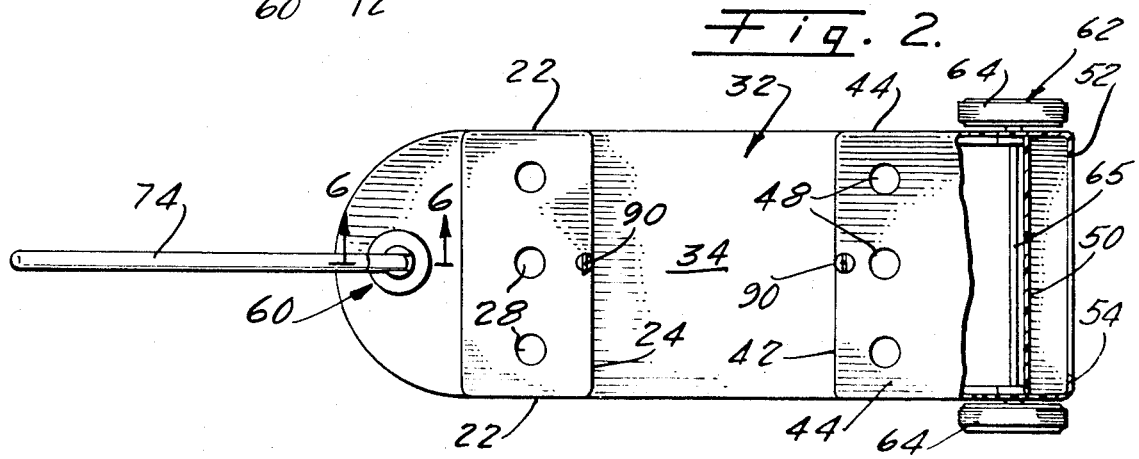
FIG. 2 is a top-plan view thereof.
Figure 3:
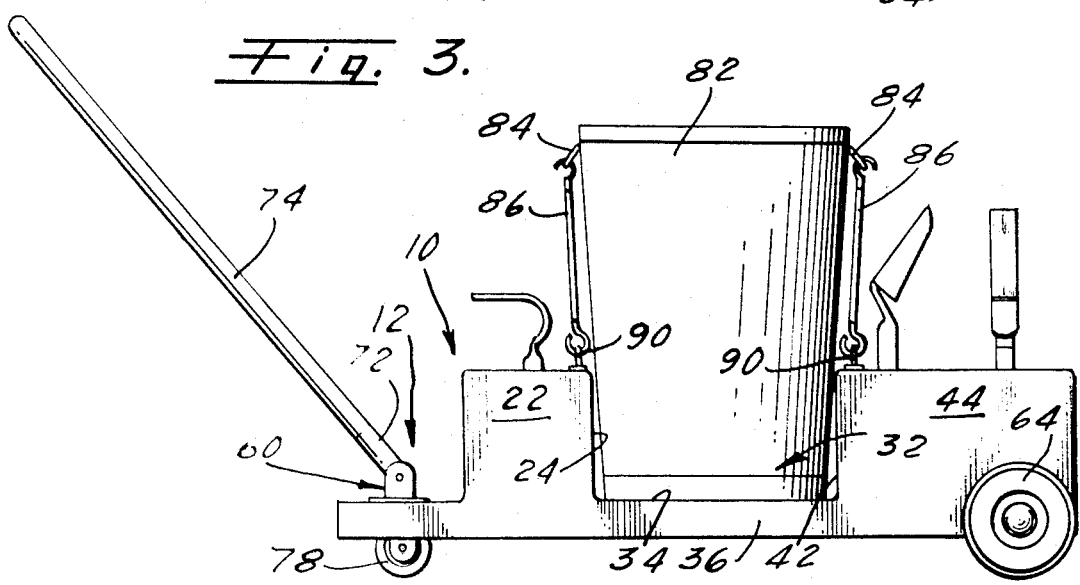
FIG. 3 is a side-elevational view illustrating a trash container supported thereon.
Figure 4:
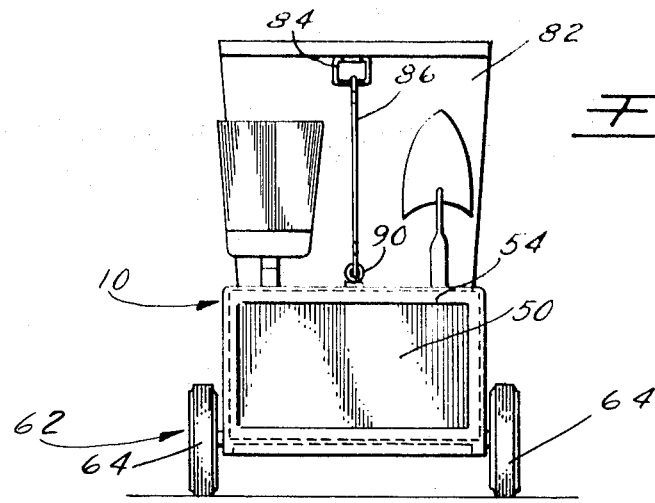
FIG. 4 is a rear-elevational view of the utility cart.
Figure 5:
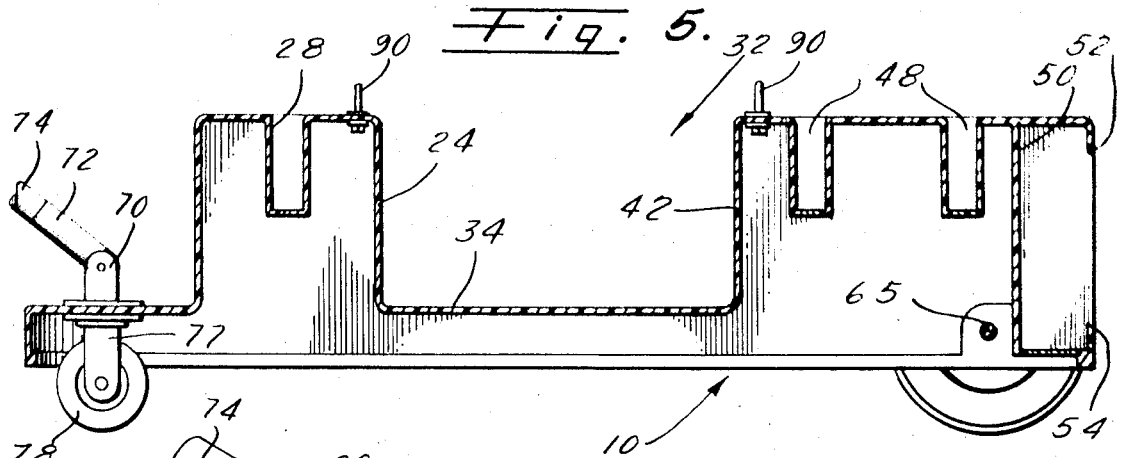
FIG. 5 is a cross-sectional view taken along line 5—5 of FIG. 1.

The body shell is generally indicated by reference character 10 comprising a forward lower bed frame 12 having a flat upper wall 14 which is provided with a depending flange member 16 whereby said bed frame 12 is held in a rigid condition. The lower bed frame 12 extends rearwardly and is integrally connected to a box-shaped carriage housing, generally indicated at 18, and defined by a forward wall 20 which is designed to be an integral extension of the flat upper wall 14 of the lower bed frame 12, said housing including oppositely disposed side walls 22 and a rear wall 24. Said front wall 20, rear wall 24 and side walls 22 are all integrally joined to form the box-shaped configuration by top wall 26. Centrally positioned and evenly spaced within the top wall 26 is a plurality of receptacles 28, as seen in FIGS. 1, 2 and 5. Each receptacle is defined by an opening 30 within the top wall 26 to which a tubular sleeve 32 is affixed, said tubular sleeve being connected to the lower surface thereof and being in axial alignment with said opening 30. These receptacles are provided therein to receive various heads related particularly to garden tools, such as shown in FIGS. 3 and 4, said tool heads being represented as hoes, shovels, brooms, etc.

Extending further to the rear and following the first box-shaped housing 18, there is provided an intermediate lower bed frame, generally indicated at 32. Because of the uni-construction feature of this invention, the lower bed flat-top wall 36 is also an integral part of the shell-like body 10 and is formed as an extension of rear wall 24 of the carriage 18. From here to the top wall there is provided reinforcing, de-pending side flanges 36. Thus, this intermediate bed frame 32 provides a void or open space between the forward first box-shaped carriage 18 and the rear second box-shaped carriage housing, indicated generally at 40. The rear carriage housing is constructed in a similar manner to said forward carriage having a front vertical wall 42 integrally secured to top wall 34 of the intermediate frame 32, together with side walls 44 and top wall 46, which is also provided with a plurality of receptacles 48 defined in the same manner as receptacles 28. However, the rear portion of carriage housing 40 is adapted to carry various items such as chemicals, gloves, shears, etc. This is accomplished by providing a cavity 50, as seen in FIGS. 2, 4 and 5, said cavity being defined by an enlarged opening 52 in the rear wall 54 and a partition 56 depending from the upper top wall 46, and having a shelf disposed between said partition 56 and said rear wall 54.

It is contemplated that a vacuum-forming process will be used to form the body. However, various known methods can be used as alternatives. Therefore, plastic, such as fiberglass, is intended as the most likely material to be used that would be compatible to the intended process, which will provide a very economical end product.

Figure 6:
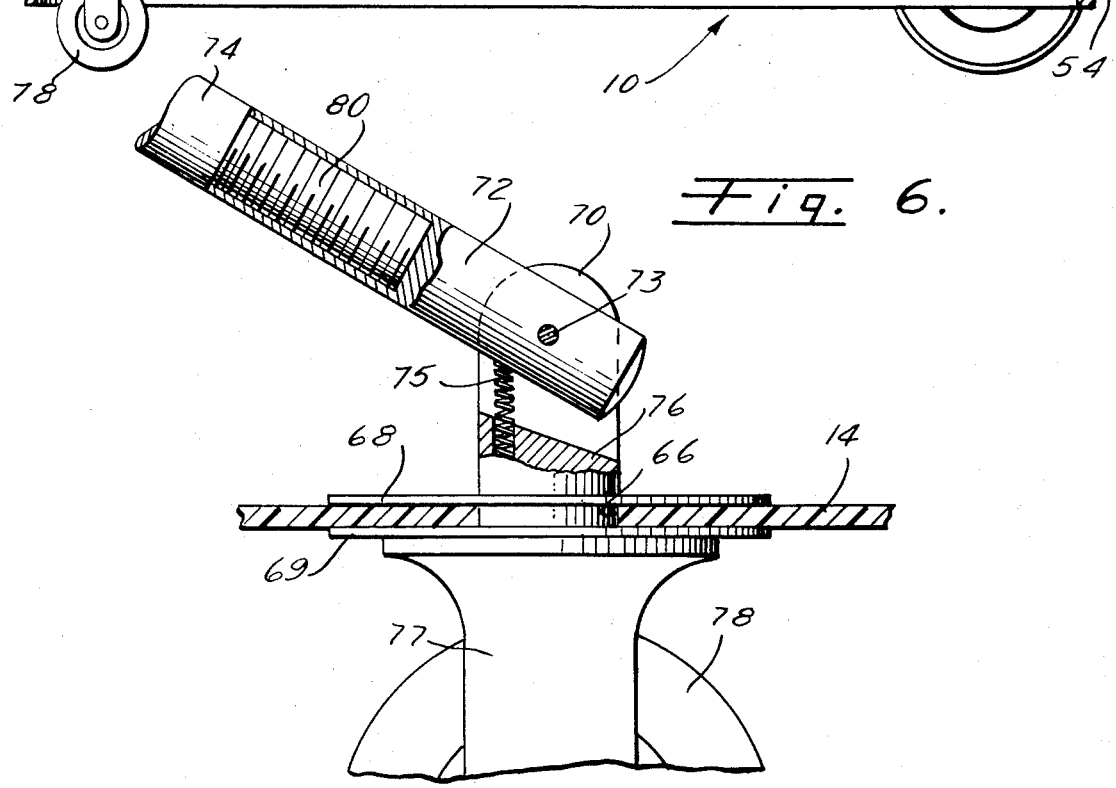
FIG. 6 is an enlarged cross-sectional view taken along line 6—6 of FIG. 2 showing the steering means of said invention.

The shell-like body is transported from one area to another by steering means 60 rotatably supported in the forward lower bed frame 12, as better seen in FIG. 6, and further including a rear wheel assembly, indicated generally at 62, having oppositely disposed bearing wheels 64 rotatably supported by a transverse axle 65 journaled in any suitable manner in the rear area of body frame 10.

Referring particularly to FIG. 6, the steering means 60 is illustrated as being supported by top wall 14 through opening 66, and held in rotating relationship thereto by circular flanges 68 and 69, respectively. Flange 68 is adapted with upwardly extending ears 70 between which a handle-mounting bar 72 is operably disposed by pin 73, said bar having a threaded recess at its free end to receive correspondingly threaded handle 74. To prevent said handle from dropping out of reach of the operator thereof, a spring 75 is vertically disposed in the base member 76 so as to engage with said mounting bar 73, thereby limiting downward movement of the handle 74. Depending from said circular flange 69, there is formed a pair of oppositely disposed ears 77 between which is rotatably mounted a guide wheel 78.

The threaded end 80 of handle 74 is also adapted to be received within the free ends of each tool head, thereby providing a multiplicity of garden tools when required.

In addition to the tools, various trash containers, indicated at 82 in FIGS. 3 and 4, can be accommodated between the first housing 18 and the second housing 40, said container 82 being supported on the intermediate frame 32. Generally provided on most trash containers is a pair of oppositely disposed handles 84. Thus, to prevent the container from tipping over, each handle is secured to its respective corresponding housing by a securing means, shown as hold-down straps 86 and 88, respectively. Each strap is attached at one end thereof to oppositely disposed eye hooks 90 and removably attached to each handle 84. Said eye hooks 90 are mounted to the inward edge of each housing.

The invention and its attendant advantages will be understood from the foregoing description and it will be apparent that various changes may be made in the form, construction and arrangement of parts of the invention without departing from the spirit and scope thereof or sacrificing its material advantages, the arrangement hereinbefore described being merely by way of example, and we do not wish to be restricted to the specific forms shown or uses mentioned, except as defined in the ccompanying claims.

We claim:

1. A utility cart and the like comprising:
a uniconstructed body formed as a monolithic shell, said body having
a leading low-bed frame,
a first carriage housing,
a second carriage housing, wherein each of said carriage housings has front, back, side and top walls formed as integral parts of said body,
an intermediate low-bed frame integrally attached between said first and second carriage housings, and
a plurality of vertical receptacles disposed within said first and second housings, and wherein said receptacles are defined by openings having tubular sleeves depending downwardly therefrom;
a steering means operably mounted in said leading low-bed frame, said steering means comprising:
a handle having one end thereof threaded,
a rotatably mounted base member,
a handle-mounting bar movably attached to said base member and adapted to removably receive said handle, and
a wheel rotatably mounted to the lower portion of said base member.

2. A utility cart as recited in claim 1, including a multiplicity of various heads of tools adapted to be removably received in said receptacles and removably attached to the threaded end of said handle when said handle is removed from said cart.

* * * * *